United States Patent
Barton et al.

(10) Patent No.: US 9,774,689 B2
(45) Date of Patent: Sep. 26, 2017

(54) SCHEDULING MEDIA RECORDING VIA A HANDHELD DEVICE

(71) Applicant: TiVo Solutions Inc., San Carlos, CA (US)

(72) Inventors: James M. Barton, Los Gatos, CA (US); Kirk D. Wong, San Jose, CA (US)

(73) Assignee: TiVo Solutions Inc., San Carlos, CA (US)

( * ) Notice: Subject to any disclaimer, the term of this patent is extended or adjusted under 35 U.S.C. 154(b) by 222 days.

(21) Appl. No.: 13/800,892

(22) Filed: Mar. 13, 2013

(65) Prior Publication Data

US 2013/0246584 A1 Sep. 19, 2013

Related U.S. Application Data

(60) Provisional application No. 61/610,384, filed on Mar. 13, 2012.

(51) Int. Cl.
| | |
|---|---|
| *H04L 29/08* | (2006.01) |
| *H04L 29/06* | (2006.01) |
| *G06Q 30/02* | (2012.01) |
| *G06F 15/16* | (2006.01) |

(52) U.S. Cl.
CPC .......... *H04L 67/18* (2013.01); *H04L 65/1059* (2013.01); *H04L 67/325* (2013.01); *G06Q 30/02* (2013.01)

(58) Field of Classification Search
CPC ... H04N 5/782; H04N 7/17318; H04W 12/06; G06Q 30/00; G06Q 30/02; H04L 67/18; H04L 65/1059; H04L 67/325; H04L 67/19
USPC .................... 709/217–219; 726/5; 705/14.54
See application file for complete search history.

(56) References Cited

U.S. PATENT DOCUMENTS

| | | | | |
|---|---|---|---|---|
| 8,590,023 | B2 * | 11/2013 | Gupta et al. | 726/5 |
| 8,831,399 | B2 * | 9/2014 | Meare | 386/234 |
| 2006/0277272 | A1 * | 12/2006 | Cantalini | 709/217 |
| 2007/0253675 | A1 | 11/2007 | Weaver | |
| 2007/0256112 | A1 | 11/2007 | Weaver | |

(Continued)

FOREIGN PATENT DOCUMENTS

| | | | | |
|---|---|---|---|---|
| EP | 2706763 A1 * | 3/2014 | | H04M 1/72525 |
| JP | 2002-064768 | 2/2002 | | |

(Continued)

OTHER PUBLICATIONS

Andrew Munchbach, AT&T U-Verse mobile app allows you to manage DVR, watch shows, Aug. 10, 2010, www.bgr.com, http://bgr.com/2010/08/10/att-u-verse-mobile-app-allows-you-to-manage-dvr-watch-shows/#.*

Bob Bhatnagar, How do I connect to free AT&T iPhone Wi-Fi?, Jun. 2, 2009, www.iphonefaq.org, https://web.archive.org/web/20090605080815/http://www.iphonefaq.org/archives/97563.*

ATT U-verse, cox cable rate increase—Discussion on Topix, Apr. 5, 2011, www.topix.com, http://www.topix.com/forum/city/abbeville-la/TM4NHGS0C5FPEI7S7.*

(Continued)

*Primary Examiner* — David Lazaro
*Assistant Examiner* — Zi Ye
(74) *Attorney, Agent, or Firm* — Haley Guiliano LLP

(57) ABSTRACT

Techniques for scheduling content recordings at a multimedia device are described. A mobile device receives an invitational message from a local wireless network. In response to receiving the invitational message, the mobile device sends a scheduling request/instruction to a server or to the multimedia device directly. The scheduling request or instruction causes a recording of the specific media content at a multimedia device to be scheduled.

22 Claims, 6 Drawing Sheets

(56) References Cited

U.S. PATENT DOCUMENTS

| | | | |
|---|---|---|---|
| 2008/0082402 A1* | 4/2008 | Turrentine | G06Q 30/02 705/14.54 |
| 2009/0293098 A1 | 11/2009 | Pirani | |
| 2010/0162305 A1 | 6/2010 | Downey et al. | |
| 2010/0332315 A1 | 12/2010 | Kamar et al. | |
| 2010/0333137 A1* | 12/2010 | Hamano | H04H 60/46 725/39 |
| 2011/0238474 A1* | 9/2011 | Carr et al. | 705/14.23 |
| 2011/0246291 A1* | 10/2011 | Paul | 705/14.49 |
| 2011/0246370 A1 | 10/2011 | Wang et al. | |

FOREIGN PATENT DOCUMENTS

| | | |
|---|---|---|
| JP | 2002-271509 | 9/2002 |
| JP | 2003-316909 | 11/2003 |
| JP | 2006-304109 | 11/2006 |
| JP | 2007-132884 | 5/2007 |
| JP | 2008-042862 | 2/2008 |
| JP | 2011-097195 | 5/2011 |
| JP | 2011-258203 | 12/2011 |

OTHER PUBLICATIONS

European Patent Office, "Search Report and Written Opinion" in application No. PCT/US13/30823, dated May 28, 2103, 7 pages.

Current Claims in application No. PCT/US13/30823, dated May 28, 2013, 7 pages.

Japanese Patent Office, Application No. 2015-500554, Foreign Office Action dated Dec. 1, 2015.

Japanese Patent Office, Application No. 2015-500554, Pending Claims as of Dec. 1, 2015.

European Patent Office, Application No. 13760469.0, Extended European Search Report dated Sep. 28, 2015.

European Patent Office, Application No. 13760469.0, Pending Claims as of Sep. 28, 2015.

Chinese Patent Office, Application No. 201380025165.8, Foreign Office Action dated Sep. 23, 2016.

Chinese Patent Office, Application No. 201380025165.8, Pending Claims as of Sep. 23, 2016.

* cited by examiner

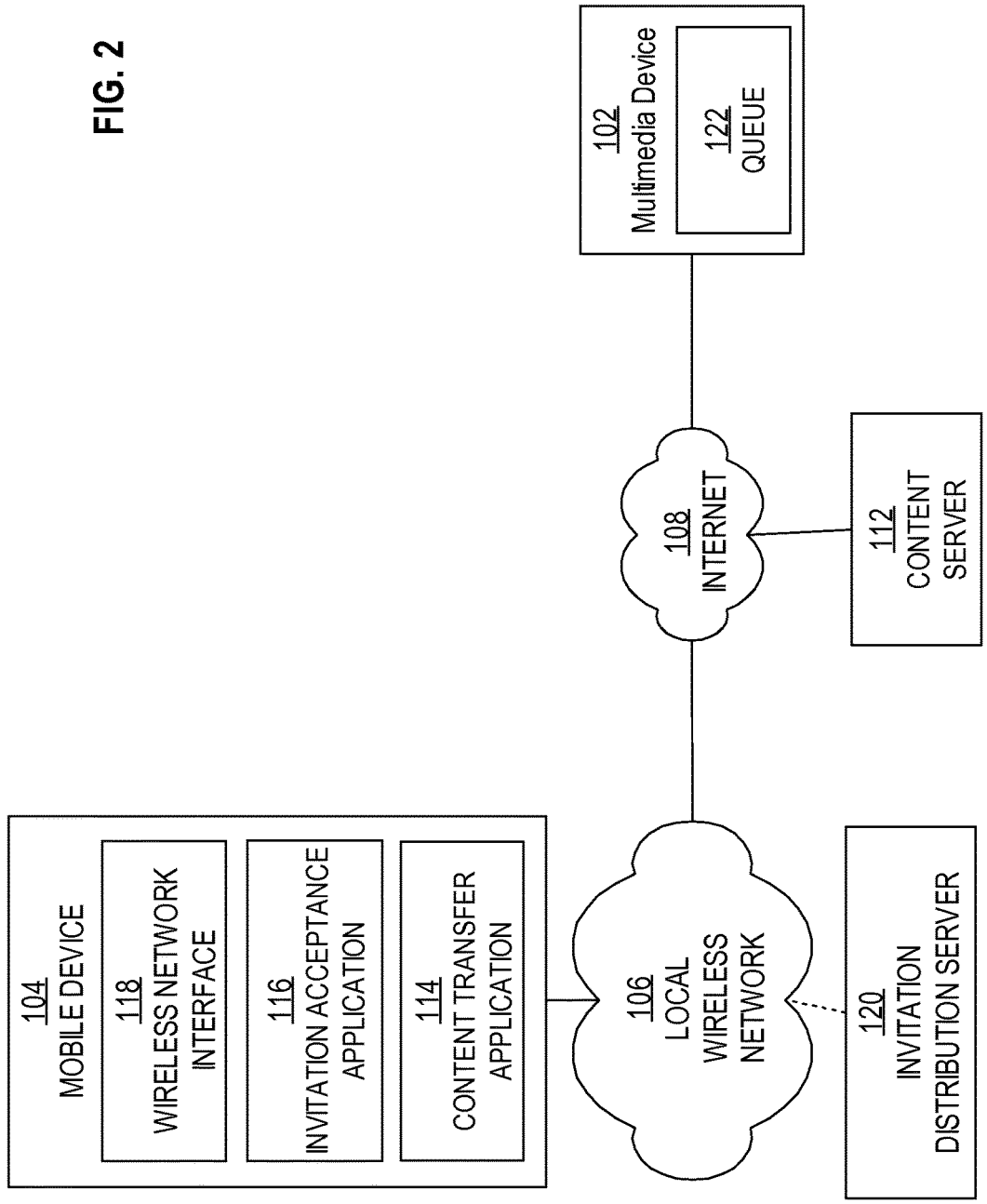

a mobile device receives an invitational message from a local wireless network 310 in response to receiving the invitational message, the mobile device sends a scheduling request to a content transfer scheduling server for specific media content, the scheduling request causing a transfer/recording of the specific media content to a multimedia device to be scheduled 320

FIG. 3A a mobile device receives an invitational message from a local wireless network 350 in response to receiving the invitational message, the mobile device sends a scheduling instruction to a multimedia device to cause a transfer/recording of the specific media content to a multimedia device to be scheduled 360

FIG. 3B

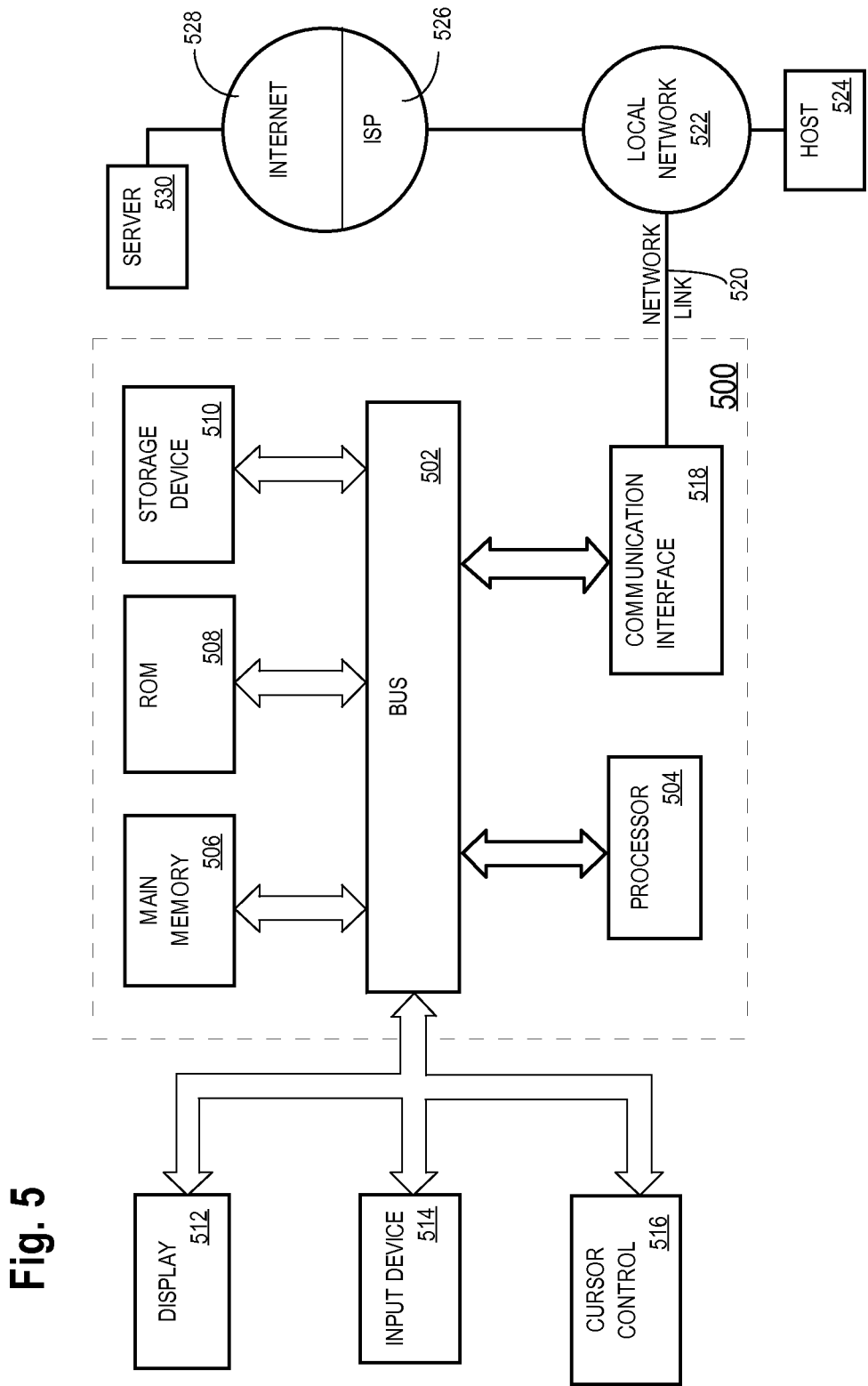

SCHEDULING MEDIA RECORDING VIA A HANDHELD DEVICE

CROSS-REFERENCE TO RELATED APPLICATION; BENEFIT CLAIM

This application claims priority to Provisional Patent Application No. 61/610,384 entitled Scheduling Media Recording Via A Handheld Device, filed on Mar. 13, 2012, by James M. Barton and Kirk D. Wong, the contents of which are incorporated herein by reference.

FIELD OF THE INVENTION

The present invention relates to media recording. Specifically, the invention relates to using a mobile device to schedule media recording.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Laptops, tablets, phones, personal digital assistants (PDAs), and many other mobile devices are able to connect to local wireless networks as these devices visit various locations. For example, at a coffee shop, a mobile device may connect with a local wireless network through an access point deployed in the coffee shop.

Multiple local wireless networks may be deployed by various operators at a location. Login information for past connections may be saved and carried with a mobile device, and reused in new connections. Unexpired login information for a past connection with a local wireless network may be automatically reused in a new connection to the same network. Unexpired login information may also be used to automatically connect to different local wireless networks. The same operator may deploy different physical access points in different locations with the same identifier (e.g., SSID). Login information with one access point may be reused in a connection with a different access point with the same identifier.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram illustrating another example system in accordance with one or more embodiments;

FIG. 3A and FIG. 3B illustrate methods for scheduling content transfers to multimedia devices, in accordance with one or more embodiments;

FIG. 5 shows a block diagram that illustrates a system upon which an embodiment of the invention may be implemented.

DETAILED DESCRIPTION

Figure 1:
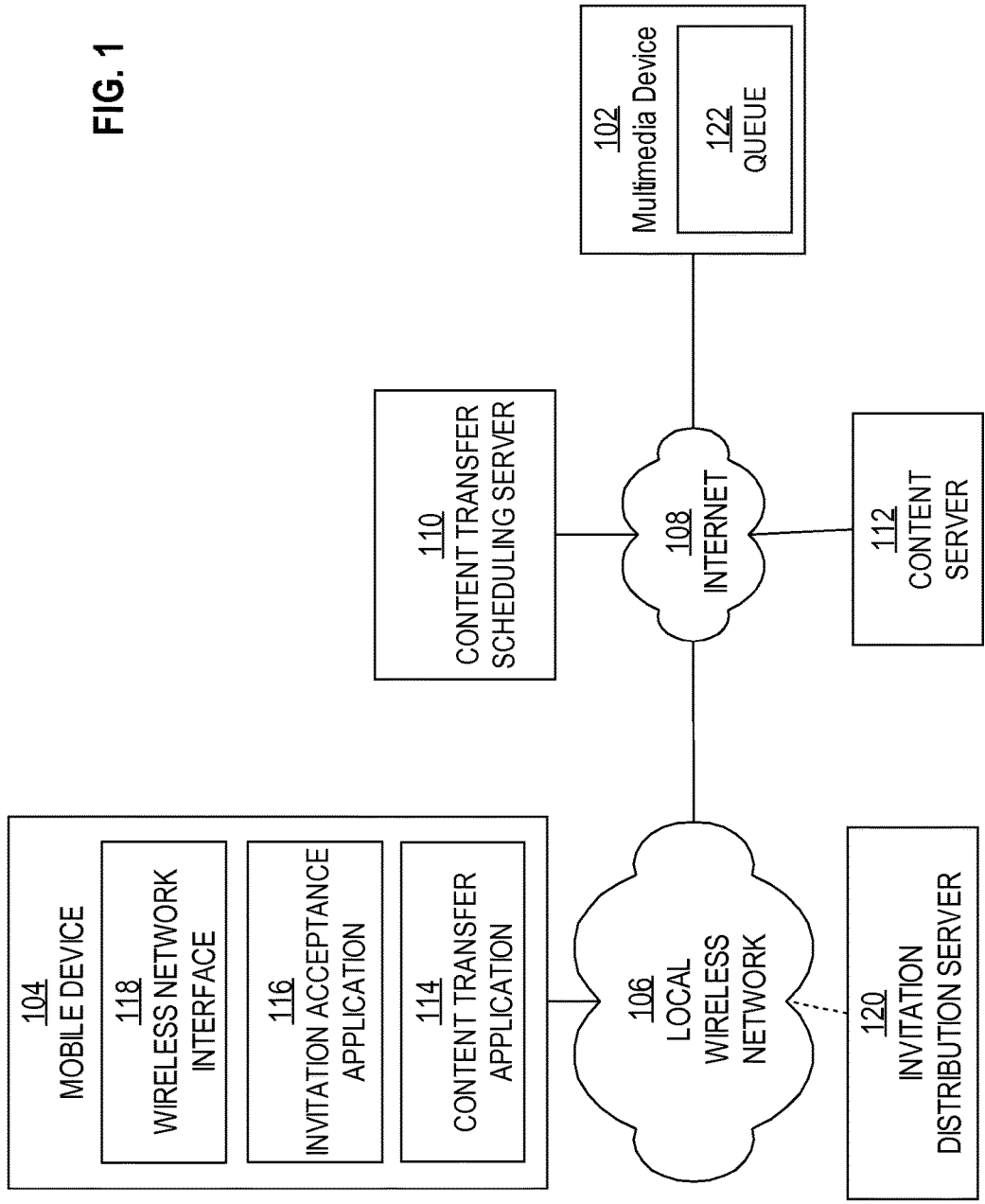
FIG. 1 is a block diagram illustrating an example system in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:
   1.0 FUNCTIONAL OVERVIEW
   2.0 SYSTEM ARCHITECTURE
   3.0 RECEIVING LOCATION-DEPENDENT INVITATIONAL MESSAGES
   4.0 SCHEDULING CONTENT TRANSFER/RECORDING WITH A SERVER
   5.0 SCHEDULING CONTENT TRANSFER/RECORDING WITHOUT A SERVER
   6.0 RECEIVING QUICK RESPONSE (QR) CODES WIRELESSLY
   7.0 EXAMPLE MULTIMEDIA DEVICE
   8.0 EXAMPLE EMBODIMENTS
   9.0 HARDWARE OVERVIEW
   10.0 EXTENSIONS AND ALTERNATIVES

1.0 FUNCTIONAL OVERVIEW

In an embodiment, a mobile device may be connected to a local wireless network which sends invitational messages to the mobile device. In an embodiment, the invitational messages are location dependent; the content and/or availability of the invitational messages vary based on a present location of the mobile device.

Examples of mobile devices include, but are not limited to: mobile phones, computing pads, laptops, personal digital assistants (PDAs), portable computing devices, electronic book readers, etc. Examples of locations of mobile devices include, but are not limited to: amusement parks, museums, billboards, restaurants, bookstores, coffee shops, shopping malls, etc. Examples of invitational messages include, but are not limited to: advertisements, offers, or announcements for TV shows, TV series, movies, movie trailers, documentaries, multimedia content, publications, books, presentations, etc.

In some embodiments, an invitational message may comprise a quick response (QR) code image in a standard image format (e.g., a JPEG image, TIFF, etc.); the QR code image may be optically scanned and translated (e.g., by the mobile device, service, etc.) into a QR code. The optically recognized QR code may comprise a message relating to a goods or service, and/or an address (e.g., a network address, a physical address, etc.) at which a goods or service may be accessed, purchased, downloaded, recorded, etc.

In an embodiment, in response to receiving an invitational message as described herein, the mobile device may interact with the user of the device to decide/select a responsive action to the invitational message.

In an embodiment, the user may be presented by the mobile device with selections of actions in relation to the invitational message. An example of selection of action may be, but is not limited to, any of: scheduling recording or downloading multimedia content (e.g., the TV show as previously mentioned, Internet content, etc.), by a multimedia device (e.g., a digital video recorder owned by the user, PC, etc.).

In an embodiment, the user may decide to ignore the invitational message by making no selection for any action. In an embodiment, the user may have already configured the mobile device to automatically select a particular action in response to receiving a certain invitational message. In an embodiment, the user may provide user input to select an action made available by the mobile device after the receipt of an invitational message. For example, the mobile device may receive an invitational message announcing that a specific TV show will be shown on a local channel 6 at a specific time. The user may select an action made available by the mobile device after the receipt of the invitational message, including scheduling recording of the TV show by a multimedia device at a remote location. The multimedia device may be scheduled to record the same TV show: from a different media source, from a different channel, of a different version (e.g., a high definition version versus a low resolution version on local channel 6 at the location where the mobile device is currently visiting), etc.

In some embodiments, in response to receiving a selection by the user, the mobile device may send a request (e.g., a scheduling request, etc.) to a content transfer (and/or recording) scheduling server to instruct a multimedia device to perform an action corresponding to the user's selection. An example of content transfer scheduling server may be, but is not limited to, any of: a centralized server, a service, a server application integrated into the multimedia device, etc. An example of "instructing a multimedia device to perform an action" may include, but is not limited to, setting up the user's multimedia device, which may be located at the user's home, to download or record multimedia content such as: an electronic book, a presentation, a TV program, a movie, a movie trailer, to obtain a season pass (e.g., to download every available episode of or to record any new or rerun episode whenever broadcasted) for a TV series, etc. In an embodiment, the content transfer scheduling server may be a dedicated server (e.g., a personal computer collocated with the multimedia device, etc.). In another embodiment, the content transfer scheduling server may not be dedicated to the multimedia device but rather may be configured to interact and control a plurality of multimedia devices of different users; one of the multimedia devices may be the user's multimedia device located remotely from the user's mobile device when the location-dependent invitational message is received.

In some embodiments, scheduling content transfer by a multimedia device may be performed without any intervention of a content transfer scheduling server. In some embodiments, in response to receiving a selection by the user, the mobile device may communicate directly with a multimedia device to instruct the multimedia device to perform an action corresponding to the user's selection. For example, the mobile device may directly instruct the multimedia device to download or record media content such as: an electronic book, a presentation, a TV program, to obtain a season pass for a TV series, etc. In an embodiment, a content transfer scheduling server may even be absent. In another embodiment, a content transfer scheduling server may be present but is bypassed when a mobile device is used to schedule content transfer directly with a multimedia device.

In some embodiments, the recipient of media content relating to a received invitational message as described herein may not be required to be a multimedia device remotely located from the mobile device. Also, in some embodiments, the recipient of media content relating to a received invitational message as described herein may not be limited to be a multimedia device remotely located from the mobile device; content transfer as a consequence of receiving an invitational message as described herein may be scheduled for multiple multimedia devices or other recipients by a mobile device that receives the invitational message.

In some embodiments, in response to receiving a selection by the user, the mobile device may directly perform an action locally corresponding to the user's selection. For example, the mobile device may directly download or record media content by itself. Alternatively, the mobile device may schedule directly downloading or recording media content by itself.

In some embodiments, optionally and/or alternatively, one or more of the foregoing actions may be performed consecutively, sequentially, asynchronously, or concurrently.

2.0 SYSTEM ARCHITECTURE

Although specific computer architectures are described herein for the purpose of illustration, other computer architectures may be used to perform the functions described herein.

FIG. 1 is a block diagram that illustrates a system in which content transfer may be scheduled with a mobile device, according to one embodiment. The system comprises a mobile device 104 (such as is described with reference to FIG. 4 below). In an embodiment, the system also comprises a multimedia device 102 (such as is described with reference to FIG. 5 below), which communicates with other devices through the Internet 108. In an embodiment, a content transfer (and/or recording) scheduling server 110 and a content server 112 may also connect to Internet 108.

Mobile device 104 is connected to a local wireless network 106, which is connected (e.g., through a network router, a wireless router, a wireless access point, etc.) to other devices over one or more networks such as the Internet 108. In an embodiment, an invitation distribution server 120 is operatively linked to local wireless network 106. Invitation distribution server 120 may be located near local wireless network 106, or may be located remotely but operatively linked with local wireless network 106 through another network such as: the Internet 108, a Local Area Network (LAN), a Wide Area Network (WAN), an intranet, an extranet, etc.

In one embodiment, mobile device 104 is configured with a wireless network interface 118 to discover and connect to local wireless networks at different locations that mobile device 104 visits. Local wireless network 106 may be one of one or more local wireless networks that are present at a current location of mobile device 104. A local wireless network may be identified by a unique identifier, for example, a service set identifier (SSID). Mobile device 104 may be configured to connect to one (e.g., 106) of these local wireless networks, either automatically—e.g., with saved login information or credentials from a previous connection—or through a simple interactive procedure that obtains user input or consent—e.g., consent to a service agreement that also sets forth a requirement of accepting invitational messages while connected to the local wireless network.

Local wireless network 106 may be provided by a business, for example, an amusement park, a coffee shop or a bookstore, by any individual, etc. Network access through local wireless network 106 may not be like a subscribed telecommunication service, but rather provisional, temporary and location dependent, perhaps on a gratuitous basis. Local wireless network 106 may be one or any combination of: a wireless LAN, a WiFi network, an 802.11x network, a wireless personal area network (WPAN), Bluetooth, RF, IR, etc. that is compatible with wireless network interface 118 of mobile device 104. In some embodiments, local wireless network 106 may be accessed by any computing device without subscription on a temporary, as-is basis. In some embodiments, mobile device 104 may optionally and/or additionally subscribe to a wireless telecommunication service (e.g., AT&T Wireless Service). The wireless telecommunication network may be operated commercially and only open to subscribers who are charged subscription fees for network services. In contrast to a local wireless network, a wireless telecommunication network may be regulated by a governmental agency and may be required to provide universal, non-transitory network access to its subscribers.

In one embodiment, local wireless network 106, optionally through invitation distribution server 120 therein, is configured to send invitational messages to computing devices (one of which is, e.g., mobile device 104) that are presently connected to local wireless network 106. The invitation message may be location and, optionally, proximity dependent. As used herein, a "location dependent" invitation message (or simply an invitational message) refers to that the content of the invitation message is dependent on, or varies with, the present location and, optionally, proximity of mobile device 104. The proximity of mobile device 104 may be determined using any combination of: signal strength, triangulation, multiple wireless signal type triangulation, proximity detectors, etc. For example, an invitation message sent to mobile device 104 presently at a certain distance from a billboard in an amusement park may be related to a movie advertised on the billboard. An invitation message sent to mobile device 104 presently at a bookstore may be related to a book currently being promoted at the bookstore.

In some embodiments, an invitational message as described herein may include one or more of a price, a special discount, a network address (e.g., a URL), a multimedia content broadcast schedule (e.g., available start time, end time, channel, URL, title, metadata describing the content, etc.), etc. A network address as described herein may indicate where the subject matter of an invitational message, be may be accessed, recorded, or downloaded. Invitation distribution server 120 may send an invitational message to mobile device 104 in one or more individually delivered parts; the invitational message may be pushed to, or may be pulled by, mobile device 104.

In one embodiment, mobile device 104 comprises an invitation acceptance application 116 configured to receive invitational messages from local wireless network 106. The invitation acceptance application 116 may refer to one or more of: a process, a program module, an application, a plug-in, etc., in mobile device 104. The invitation acceptance application 116 may be downloaded to mobile device 104 upon acceptance by a user of terms for accessing a local network. In an embodiment, mobile device 104 is configured to interact with a user of mobile device 104 in response to receiving an invitational message and to obtain user input such as one or more selections of actions.

In an embodiment, mobile device 104 may be configured, possibly by the invitation acceptance application 116, with a user interface to interact with the mobile device's user. The user interface may comprise one or more of a textual or graphical display, an audible output, or other mechanisms (e.g., vibration) for communicating signals or messages to the user. The user interface may comprise one or more of a keyboard, a touch screen, a keypad, a voice input and recognition module, a gesture input and recognition module, keys, buttons, switches, or other mechanisms for receiving user input signals or messages from the user.

In one embodiment, mobile device 104 comprises a content transfer application 114 configured to send a scheduling request to content transfer scheduling server 110 to instruct multimedia device 102 to perform an action corresponding to a user's selection of action. In an embodiment, the content transfer application 114 may be a part of a downloaded package that includes the invitation application acceptance application 116. In another embodiment, the content transfer application 114 may be a downloaded package from a DVR manufacturer or service provider that interfaces with downloaded application acceptance applications.

In one embodiment, content transfer scheduling server 110 is configured to send instructions toward multimedia device 102 over Internet 108. As used herein, an instruction may include, but is not limited to, a message or notification that is sent by a sending device to a recipient device and that indicates to the recipient device that particular media content is available to the recipient device; the message or notification may optionally and/or additionally include or identify a location at which the particular media content may be accessed by the recipient device. Content transfer scheduling server 110 may comprise a computer on which executes a process that sends such instructions, for example. In an embodiment, an instruction comprises a URL. In another embodiment, an instruction comprises information/metadata about a media source (e.g., a TV channel, a network-based content server, a satellite signal, etc.) and, optionally, available time for downloading or recording media content. In some embodiments, more than one content server may be identified in an instruction as described herein and may be accessible for downloading or recording media content. Additionally, optionally, or alternatively, in some embodiments, one or more media sources other than a content server accessible on Internet 108 may be identified in an instruction as described herein and may be accessible for downloading or recording.

In one embodiment, content server 112 is associated with a URL. Content server 112 may comprise an HTTP server that (i) listens for Hypertext Transfer Protocol requests received through Internet 108 and (ii) responds to such HTTP requests by sending HTTP responses over Internet 108 toward the sources of those HTTP requests. The HTTP requests may specify content that the requestor desires, and the corresponding HTTP responses may contain the desired content, which is stored on content server 112. Such content may comprise encoded video content, for example.

In one embodiment, multimedia device 102 is configured to listen for and receive, through Internet 108, instructions sent from content transfer scheduling server 110. Multimedia device 102 is configured to store such instructions in a queue 122 that multimedia device 102 maintains. Multimedia device 102 is configured to read and remove an instruction from the front of queue 122. In an embodiment, multimedia device 102 is configured to determine a URL that the instruction specifies, and send, toward a content server or other device that is associated with that URL, an HTTP request for content that the URL specifies. Multimedia device 102 is configured to listen for and receive an HTTP response to such an HTTP request. Multimedia device 102 is configured to store content that is contained in such an HTTP response. In an embodiment, multimedia device 102 is configured to determine a media source, other than a URL, that the instruction specifies, and set up downloading or schedule recording from the media source specified in the instruction. Additionally and/or optionally, multimedia device 102 may be configured to determine a media source even if the instruction does not explicitly specify such; multimedia device 102 may be configured to perform a lookup, for example, based on a received program id or name, to determine an available media source for specific media content identified in the instruction, and set up downloading or recording the specific media content from the media source. The instruction may specify a quality of recording or download to be made, e.g., standard definition, high definition, ultra high definition, etc. Multimedia device 102 is configured to indicate, through a user interface, that the stored content is available for viewing by a user.

FIG. 2 illustrates a system architecture in which a content transfer scheduling server may not be involved in scheduling downloading or recording media content in connection with a location-dependent invitational message received by a mobile device from a local wireless network, in accordance with an embodiment of the present invention. Multimedia device 102 is configured to handle instructions directly received from mobile device 104. The instruction directly received from mobile device 104 may be handled by multimedia device 102 in a manner similar to the way that multimedia device 102 may be configured to handle instructions received from content transfer scheduling server 110 as previously described. Multimedia device 102 is configured to listen for and receive, through internet 108, instructions sent from mobile device 104. Multimedia device 102 is configured to store such instructions in queue 122. Multimedia device 102 is configured to read and remove such an instruction from the front of queue 122, and perform other setup tasks as previously described.

3.0 RECEIVING LOCATION-DEPENDENT INVITATIONAL MESSAGES

In an embodiment, a plurality of mobile or web applications such as invitation acceptance application 116 and content transfer application 114 may be preconfigured at a time before the activation of mobile device 104, or installed on mobile device 104 at a later time. Any of these applications may be one of: a mobile-resident application, cloud-based application, a web-based application, etc.

As mobile device 104 visits different locations, a variety of local wireless networks may be encountered/discovered by mobile device 104 along the way. These local wireless networks, which may be operated/controlled by different entities, may cover limited spaces around specific locations (e.g., a radius of 50 meters, a street corner, a billboard, a store, a building, a location in a shopping mall, a gallery of museum, etc.). Connections to these local wireless networks may be offered on a condition of consent to receiving invitational messages, solicited or not.

A connection between mobile device 104 and a local wireless network (e.g., 106 of FIG. 1 and FIG. 2) may involve mutual identification. For example, local wireless network 106 may identify itself to all visiting devices using a local wireless network id, e.g., an SSID, etc. A local wireless network id as described herein may refer to any piece of information that uniquely and/or operatively identifies a local wireless network to a mobile device relative to other local wireless networks that provide network connections at the same current location of the mobile device.

Likewise, mobile device 104 may identify itself to a local wireless network to which mobile device 104 would like to connect using a mobile device id. A mobile device id as described herein may refer to any piece of information that uniquely and/or operatively identifies a mobile device to a local wireless network relative to other devices communicating with the same local wireless network. In an embodiment, the mobile device id may be in the form of one or more of: an address (e.g., an MAC address, etc.), a machine-unique id, an immutable id of mobile device 106 set up by a vendor, a hardwired id, a system configurable id, a ROM-based id, an electronic subscriber id, a login id, a user login and password pair, credentials, an account name, a standard-based id, a proprietary id, a security id, etc. As described herein, a mobile device id that is used by mobile device 104 to connect to a local wireless network may or may not be specific to the local wireless network. For example, in some embodiments, mobile device 104 may use a first mobile device id to connect to a hot spot/local wireless network that is provided by a first party, but may use a second different mobile device id to connect to a hot spot/local wireless network that is provided by a second party, and use a third different mobile device id to connect to a hot spot/local wireless network that is provided by a third different party. In some embodiments, mobile device 104 may use a mobile device id, such as an MAC address, that is not specific to any specific local wireless network at least in some local wireless networks. In some embodiments, mobile device 104 may use a mobile device id that combines a part specific to a local wireless network with another apart not specific to the local wireless network.

In some embodiments, a password including a one-time-password (OTP) may be used as an integral part of, or alternatively, as a separate addition to, a mobile device id, for the purpose of connecting to a local wireless network.

In some embodiments, local wireless networks in different locations may use the same local wireless network id, so as to identify that all these local wireless networks are associated with a national chain of business entities. For example, AT&T may be contracted to provide local wireless networks at all U.S. based Starbucks locations, which may include a Starbucks coffee shop in Phoenix, Ariz. where mobile device 104 is first connected—perhaps after consenting to receiving invitational messages from the local wireless network. As the user flies to New York City, mobile device 104 may discover another local wireless network at another Starbucks coffee shop. The other wireless network may recognize, for example through a mobile device id of mobile device 104, that mobile device 104 was previously connected to the local wireless network in Phoenix, Ariz. As a result, the other local wireless network in New York City may automatically allow connection by mobile device 104, and may provide invitational messages to mobile device 104 that are location dependent (e.g., content of the invitational messages may take into consideration that this location is Starbucks, New York City, etc.). The invitational messages sent to mobile device 104 in the first local wireless network may be specific to Phoenix, Ariz. (e.g., referring to a local TV channel, a local business, a local event, etc., in Phoenix, Ariz.), whereas the invitational messages sent to mobile device 104 in the second local wireless network may be different, for example, specific to New York City (e.g., referring to a local TV channel, a local business, a local event, etc., in New York City). In an embodiment, at least one of the invitational messages may be the same in all affiliated businesses such as all Starbucks locations in the U.S., but may still be different from an invitational message mobile device 104 may be receiving at a MacDonald's, even though the local wireless network at the MacDonald's may also be contracted through AT&T.

A user's consent to receive invitational messages from a local wireless network (e.g., 104 of FIG. 1) may be given explicitly and on demand when mobile device 104 tries to use the local wireless network. A user's consent to receive invitational messages from a local wireless network may also be given implicitly and/or before mobile device 104 tries to use the local wireless network. For example, the user's consent to receive invitational messages at a Starbucks coffee shop in Phoenix may be explicitly given, while the user's consent to receive invitational messages at a Starbucks coffee shop in New York City may be inferred by the fact that mobile device 104 uses the same account information (e.g., mobile device id, etc.) to connect to the local wireless network at the Starbuck coffee shop in New York City. In an embodiment, consent to receive invitational messages may be given explicitly beforehand. For example, the user may access a webpage beforehand and sign up for local wireless network access for local wireless networks made available by a WiFi service provider. In an embodiment, consent to receive invitational messages may be given explicitly when mobile device 104 is activated. For example, a telecommunication service provider that provides telecommunication services (e.g., regulated, subscription-based, with voice services, generally universal to any paid subscriber) may also operate hotspots/local wireless networks at multiple locations, perhaps contracted by different businesses or individuals. When mobile device 104 is activated with the telecommunication service provider for the telecommunication services, an option may be given to the user to get access to the hotspots/local wireless networks on the condition that the user consents to receive invitational messages via mobile device 104.

Different location-dependent invitational messages may be sent by local wireless networks from different locations of a business or premise. For example, the user with mobile device 104 may visit an amusement park and encounter billboards of different types or shows of different themes. The user may accept an agreement to access the amusement park's local wireless network upon entry to the amusement park. In an embodiment, an amusement park-specific invitation acceptance application may be downloaded to the mobile device 104 upon the user's acceptance or an amusement park-specific user interface may be used by an invitation acceptance application already resident on the mobile device 104. Local wireless network 106 may distribute customize invitational messages to mobile device 104 based on where the user with mobile device 104 is currently present. In an embodiment, the customized invitational messages may be created and/or sent by a local or remote server via local wireless network 106. When the user is present at or near a billboard advertising a movie of a fairytale, for example, an invitational message that provides a URL to download the movie of the fairytale may be sent to mobile device 104. When the user is present at a billboard advertising a horror movie, new release program series, etc., an invitational message that provides a program id and a local channel id to view the horror movie, program series, etc., may be sent to mobile device 104.

When the user is visiting a bookstore that is promoting a local author or local subject matter, an invitational message that provides a URL to download an electronic version of a book of the local author or relating to local subject matter may be sent to mobile device 104.

When the user is visiting a museum, a mall, etc., an invitational message that provides invitations to various products or services may be sent to mobile device 104. For example, at a museum, while the user is present at a gallery that hangs a work of Rembrandt's, an invitational message to receive media content such as a presentation, an audio talk, etc. may be sent to mobile device 104 via a local wireless network (e.g., 104 of FIG. 1) to which mobile device 104 is presently connected.

In an embodiment, an invitational message may include more than one invitation to more than one piece of media content. Different types of media content may also be identified in the same invitation message sent wirelessly to a mobile device.

4.0 SCHEDULING CONTENT TRANSFER/RECORDING WITH A SERVER

In an embodiment, a mobile device (e.g., 104 of FIG. 1 and FIG. 2) may communicate with a multimedia device (e.g., 102 of FIG. 1 and FIG. 2) directly or indirectly. A user may use mobile device 104 to schedule multimedia device 102 to transfer media content identified in, or determined based on, a received invitational message. In some embodiments, scheduling content transfer may be performed with the intervention of a content transfer scheduling server (e.g., 110 of FIG. 1).

For example, mobile device 104 may receive an invitational message for specific media content such as the "NCIS" show. The invitational message may optionally and/or additionally include a program id for the media content. The invitational message may include a name for the media content, a local TV channel number, a satellite TV channel number, a URL for downloading or watching the media content, a short description about the media content, a QR code image identifying the media content, etc.

In an embodiment, mobile device 104 may block/ignore one or more of the received invitational messages. For example, the user may have instructed so via a user interface to mobile device 104. In an embodiment, mobile device 104 may perform scheduling content transfer automatically with one or more of the received invitational messages. In an embodiment, mobile device 104 may perform scheduling content transfer at least in part by interacting with the user. For example, in an embodiment, in response to receiving the invitational message, an application running on mobile device 104 may pop up a message or present an overlaid icon on the mobile device's display for a time interval or use another output technique to alert the user of subject matter of the invitational message and to prompt the user to provide input as to whether an action responsive to the invitational message should be taken. Mobile device 104 may present the user with one or more selections for one or more actions. One of the actions may be to schedule content transfer with specific media content determinable from the invitational message. Another of the actions may be to schedule a season pass for a TV series determinable from the invitational message. As used herein, scheduling a season pass for a show series refers to scheduling recording of two or more (in a non-limiting example, including all subsequent) episodes for the same show series. Yet another of the actions selectable by the user may be to do nothing. The user may also choose to ignore the invitation represented by the invitational message by providing no selection with respect to the invitational message, indefinitely, or for a configured period of time.

In response to the user's selection of an action, mobile device 104 may perform the action, or cause the action to be performed. Mobile device 104 may contact content transfer scheduling server 110 to schedule recording or downloading of media content by multimedia device 102. In an embodiment, content transfer scheduling server 110 may be a central server that manages content transfer scheduling for a plurality of multimedia devices including, but not limited to, multimedia device 102. These multimedia devices may be owned or used by different users, who may or may not be equipped with mobile devices such as 104 of FIG. 1.

Mobile device 104 may be configured to optically recognize, textually parse, or otherwise process invitational messages received from local wireless network 106. In embodiments in which an invitational message announces that a TV show "NCIS" is on Channel 6 in New York City, mobile device 104 may parse the content of the invitational message and turn this announcement into an invitation for the user to make a selection for an action with respect to the TV show. After the user selects an action to schedule content transfer, mobile device 104 may send a scheduling request to content transfer scheduling server 110. A non-limiting example of the scheduling request may include one or more of the name of the show "NCIS", a local channel number in New York City for the show, etc. In response to receiving the request from mobile device 104 via Internet 108, content transfer scheduling server 110 may determine the (e.g., IP) address of multimedia device 102 and a media source at which the specific media content may be accessed. Subsequently, content transfer scheduling server 110 may formulate an instruction corresponding to the received scheduling request and send the instruction to multimedia device 102 to schedule content transfer/downloading/recording for the specified media content. The media content may be downloaded, recorded, accessed, etc. by multimedia device 102 from at least one of: a cable service, an over-the-air broadcast, a satellite receiver, a content server on Internet 108, etc.

In various possible embodiments, an instruction as described herein may be formulated by mobile device 104 alone, by content transfer scheduling server 110 alone, by both mobile device 104 and content transfer scheduling server 110, or by one or more devices working in conjunction with mobile device 104. In various possible embodiments, to determine a specific media source for specific media content, at least one of: an electronic program guide (EPG), an internet content directory, an internal table or database, an external database, etc. may be consulted or searched. The results of such searches may be used to construct at least a part of the instruction to multimedia device 102. In an embodiment, multiple versions of specific media content may be found. In an embodiment, if a high definition (HD) version of media content (e.g., a TV show, movie, etc.) is available, the instruction may specify that the HD version of the media content should be accessed for content transfer.

In an embodiment, zero, one or more applications—such as invitation acceptance application 116 or content transfer application 114—running on mobile device 104 may, but is not limited to, be provided by the operator of content transfer scheduling service 110. Content transfer scheduling service 110 may be configured to accept requests for scheduling content transfer from, and to provide content transfer scheduling services to, a plurality of mobile devices. In some embodiments, a first application, as provided by a first vendor, on mobile device 104 may initially receive invitational messages from external sources, e.g., Internet 108, a telecom service provider, local wireless network 106, etc., and forward the invitational messages to respective other applications (e.g., invitation acceptance application 116) on mobile device 104 to be further processed. These other applications may include, but are not limited to, an application provided by a second different vendor.

In some embodiments, the selections of actions presented to the user by mobile device 104 are context sensitive. For example, before mobile device 104 presents any selection of action for scheduling content transfer to a multimedia device to the user, mobile device 104 may determine whether the user is associated with a specific multimedia device such as 102 of FIG. 1 and FIG. 2. If it is determined that the user is associated with a multimedia device such as 102 of FIG. 1 and FIG. 2, selections relating to the multimedia device are made available to the user of mobile device 104. As described herein, "a user who is associated with a device" may mean one or more of pre-established or present relationships between the user and the device. Examples of relationships as described herein may include, but are not limited to, any, some, or all, of: an ownership relationship in which the user owns the device, an operational relationship in which the user operates the device remotely or locally, a maintenance relationship in which the user maintains the device, a use relationship in which the user uses and/or leases the device, a control relationship in which the user controls the device, a management relationship in which the user manages the device, etc.

The determination of association between a user and a device such as multimedia device 102 may be performed by looking up configuration data stored with mobile device 104. Alternatively and/or additionally, this determination may be performed by communicating with an external party having such information; for example, in an embodiment, mobile device 104 may communicate with content transfer scheduling server 110 for the purpose of determining whether the user or mobile device 104 is associated with a specific multimedia device, in embodiments in which content transfer scheduling server 110 has access or is configured with relevant information.

In an example, mobile device 104 may receive an invitational message for watching a TV show. Mobile device 104 may determine whether the user owns a multimedia device. If it is determined that the user owns multimedia device 102, a selection of action to schedule recording the TV show by multimedia device 102 may be presented to the user on the mobile device's display. The user may provide user input that selects the presented action. In response to receiving the selection from the user, mobile device 104 may send a request to content transfer scheduling server 110 to carry out the scheduling of recording or downloading the TV show. If more than more version of the TV show is available, as determined by either mobile device 104 or content transfer scheduling server 110, a particular version such as high definition version may be selected and/or suggested as the target of scheduled downloading by multimedia device 102. A corresponding instruction may be sent by mobile device 104 or content transfer scheduling server 110 to that effect.

If mobile device 104 determines that its user is not associated with a multimedia device, then mobile device 104 may do nothing with the received invitational message as previously mentioned or may present selections that are not related to a multimedia device. For example, mobile device 104 may still present to the user a selection of action for downloading a (e.g., mobile) version of the TV show to mobile device 104, which selection may be one among a plurality of selectable of actions. It should be noted that in some embodiments, even if it is determined that the user is associated with a specific multimedia device such as 102 of FIG. 1 and FIG. 2, a selection of an action for scheduling (e.g., immediate or a delayed) downloading media content to mobile device 104 may still be presented along with another selection of an action to schedule downloading the same media content (possibly of a different version) to multimedia device 102.

As described herein, an invitational message may refer to a localized or location-dependent invitational message. An invitational message with specific content may only be available at certain specific locations such as billboards, kiosks, certain stores, certain locations, etc. For example, the invitational message may be related to a visual message displayed on a billboard or at a specific location. Once the user walks away from a location, mobile device 104 may no longer receive an invitation message with the specific content previously received at that location.

In an embodiment, an entity (e.g., invitation distribution server 120) may be configured to determine a location of mobile device 104 and to send (e.g., push) location-dependent messages such as invitational messages to mobile device 104. In an embodiment, mobile device 104 may invite (e.g., by polling) local wireless network 106 (or a local or remote server via local wireless network 106) to provide invitational messages. In an embodiment, mobile device 104 may actively search for (e.g., pull) an entity and for available invitational messages at a particular location.

In an embodiment, an invitational message as described herein may be localized and even personalized. For example, different people walking by a billboard may receive different localized invitational messages. A first user may receive an invitational message that is customized to the first user, while a second different user may receive a different invitational message that is customized to the second user, even when both users walk by the same billboard. The user's personal information and/or preferences may have been provided along with the usage agreement. Alternatively, the mobile device 104 may be queried for the user's personal information and/or preferences by local wireless network 106 or a local or remote server via local wireless network 106. Thus, personalized localized invitational messages may be sent to each user as the user's mobile device is brought to the location or is in proximity to the location.

5.0 SCHEDULING CONTENT TRANSFER/RECORDING WITHOUT A SERVER

As described herein, in some embodiments, scheduling content transfer may be performed without any intervention of a server such as content transfer scheduling server 110. In an embodiment, multimedia device 102 is configured to work directly with mobile device 104 independent of a server such as content transfer scheduling server 110 to schedule recording or transferring media content to multimedia device 102. As used herein, "a device directly working with another device" may mean that these two devices are end points in their message communication, that the device is an end point for messages directed to the device by the other device, and that the other device is an end point for messages directed to the other device by the device. In some embodiments, the messages may be mediated, switched, routed, forwarded through other devices (e.g., routers, switches, access points, servers, etc.) along the way, but these other devices are not end points in the message communication. Rather, these other devices only assist in delivering the messages to an endpoint as composed by the origination end point, generally process the messages in an agnostic manner similar to how these other devices would process any other to-be-forwarded or to-be-delivered messages.

Mobile device 104 may be configured to determine an IP address of multimedia device 102 and to directly communicate with multimedia device 102 including sending scheduling requests to multimedia device 102 and receiving responses or messages from multimedia device 102. Direct scheduling content transfer as described herein may be based on a connection through Internet 108 or another available network (which may be provided, in one possible embodiment, even by a telecommunication network or service) between mobile device 104 and multimedia device 102.

In an embodiment, multimedia device 102 may be configured to look up media content availability and scheduling information in an EPG and/or media content database locally stored with multimedia device 102. Additionally and/or alternatively, multimedia device 102 may be configured with an ability to query an external data source to perform relevant lookups and determine when and where (on Internet 108 or a TV channel, for example) for a piece of media content that the user has authorized through mobile device 104 to download or record.

6.0 RECEIVING QUICK RESPONSE (QR) CODES WIRELESSLY

In an embodiment, an invitational message sent by local wireless network 106 to mobile device 104 may comprise a QR code. In an example, the QR code may be, for example, contained in an image file wirelessly transmitted by local wireless network 106 to mobile device 104. This avoids the necessity of a user having to posture oneself to visually take a picture with a camera (e.g., cell phone, tablet, etc.), where a local wireless network is available to send the QR code or an image thereof wirelessly to mobile device 104. Without techniques as described herein, a user would not, in many visually-challenged situations, be able to obtain a good enough QR code image for an optical recognition of the QR code therein. For example, the user may be driving or otherwise may not be able to get close enough to a QR code visually displayed on a billboard. Under techniques described herein, however, the user may receive the QR code wirelessly from a local wireless network (e.g., at a billboard, etc.) without needing to visually take a picture of the QR code. Nevertheless, an embodiment adapts the use of the QR code mechanisms described herein to be used with a picture taken by a camera (e.g., cell phone, tablet, etc.).

In an embodiment, a QR code image received by mobile device 104 may be processed by mobile device 104. Additionally and/or alternatively, the QR code image may be cooperatively processed by another device in communication with mobile device 104, to determine a QR code conveyed in the QR code image. The QR code in the image may comprise and/or represent an invitational message to schedule a season pass for a TV series, an invitational message to watch a TV show on a local channel, or an invitational message to download a movie or show at a content server (e.g., 112 of FIG. 1) accessible from Internet 108, or an invitational message to view a piece of media content such as a movie, a presentation, a movie trailer, an advertisement, an electronic book, etc. The QR code in the image may also simply identify a piece of media content, which may be implicitly treated as an invitational message by mobile device 104. Mobile device 104 may perform methods, procedures, steps, etc. as described herein in response to receiving a QR code, even if it is an implicit invitational message.

In an embodiment, one or more devices (e.g., one or more of mobile device 104, content transfer scheduling server 110, content server 112, etc.) as described herein may scan a QR code image to optically recognize or obtain the QR code in the QR code image. The QR code derived from the invitational message may be used by the one or more devices in a manner similar to how an invitational message containing a textual description of an invitation would be used. The QR code may contain information that may be directly or indirectly used to determine whether one or more selections of actions relating to scheduling content transfer should be presented to the user on a display of mobile device 104. The user may select an action to authorize/initiate/cause scheduling of a content transfer, in relation to the QR code, to multimedia device 102 and/or mobile device 104. Additionally and/or optionally, at least a part of a QR code as described herein may be used to search EPG, content database, internet program content, one or more look-up tables, etc., for the purpose of determining where and when a specific piece of media content relating to the QR code is available and/or for the purpose of constructing a corresponding instruction to multimedia device 102 for scheduling content a transfer of the specific piece of media content to multimedia device 102.

In an embodiment, the QR code may contain a URL. In an embodiment, additionally and/or alternatively, the QR code may contain a program id for a published piece of media content such as a TV show, movie, etc. The program id may be assigned to the media content when the media content is made public or is published. The user may command mobile device 104 to schedule recording the TV show, movie, etc., or to obtain/schedule a season pass for a TV series.

In various possible embodiments, an invitational message as described herein may be in one of a variety formats, e.g., a format for QR codes, a format for an image file wirelessly transmitted, or another different format. The invitational message may be formulated in a standard message format in some embodiments or a proprietary message format in some other embodiments. Techniques as described herein may be implemented in a way that works with a variety of different message formats.

Mobile device 104 may interact with the user through the device's user interface to get all the options relating to scheduling a content transfer including whether the user authorizes payments for receiving/purchasing one or more pieces of paid media content. These options may be sent in the same scheduling request by mobile device 104, to content transfer scheduling server 110 or multimedia device 102 directly in different embodiments. In response to receiving the scheduling request, content transfer scheduling server 110 may determine an IP address of multimedia device 102, construct an instruction corresponding to the scheduling request, and send the instruction to multimedia device 102 to schedule content transfer. In embodiments in which mobile device 104 may directly send a scheduling request to multimedia device 102 without any intervention of a content transfer scheduling server, an instruction or the scheduling request may be directly sent by mobile device 104 to multimedia device 102. In response to receiving the scheduling request or the instruction, multimedia device 102 may perform scheduling of the content transfer to multimedia device 102 for specific content identified in the scheduling request or the instruction.

In an embodiment, a user may use a portable device such as mobile device 104 to schedule downloading or recording a movie, an electronic book, a TV show, a TV series, etc. The user may authorize any payment for the media content downloaded, recorded, or accessed. In an embodiment, the media content may be downloaded or recorded immediately or after a scheduled delay following the scheduling request from mobile device 104. The user may also obtain special prices, discounts, reduced rates, rewards, or promotions in invitational messages received from local wireless networks visited by the user, and select specific actions or provide specific options in scheduling requests or instructions.

In some embodiments, individual connections between mobile device 104 and other devices or servers may be provided in a variety of ways. Mobile device 104 may constantly connect with a device or server, or may only provisionally (e.g., for limited time duration and/or within a limited spatial range) connect with a device or server. Authentication and authorization mechanisms may be provided in one or more of these connections between mobile device 104 and other devices/servers.

As described herein, mobile device 104 may be set up to accept invitational messages based on a service or access agreement. The service agreement may be entered by the user of mobile device 104 concurrently when a connection with the other party of the service agreement is established or at a time (e.g., a negotiation time) shortly before the connection is established. Consent to receiving invitational messages may be given by the user in a variety of ways. For example, the user may set up an account preference indicating a willingness or refusal to accept invitations. The account preference may even indicate beforehand that invitations from a specific list of invitation providers may be accepted or rejected. Consent to receive invitational messages may also be given as a result of selecting a specific local wireless network among several local wireless networks available at the current location of mobile device 104. Such consent may also be given when the user walks into an amusement park, a store, a shopping mall, a restaurant, a coffee shop, an airport terminal, a museum, a library, a facility, etc. A vendor may offer free service or discounted ticket, etc. in exchange for a user's consent to receive invitational messages through the vendor's local wireless network.

7.0 EXAMPLE MULTIMEDIA DEVICE

Figure 4:
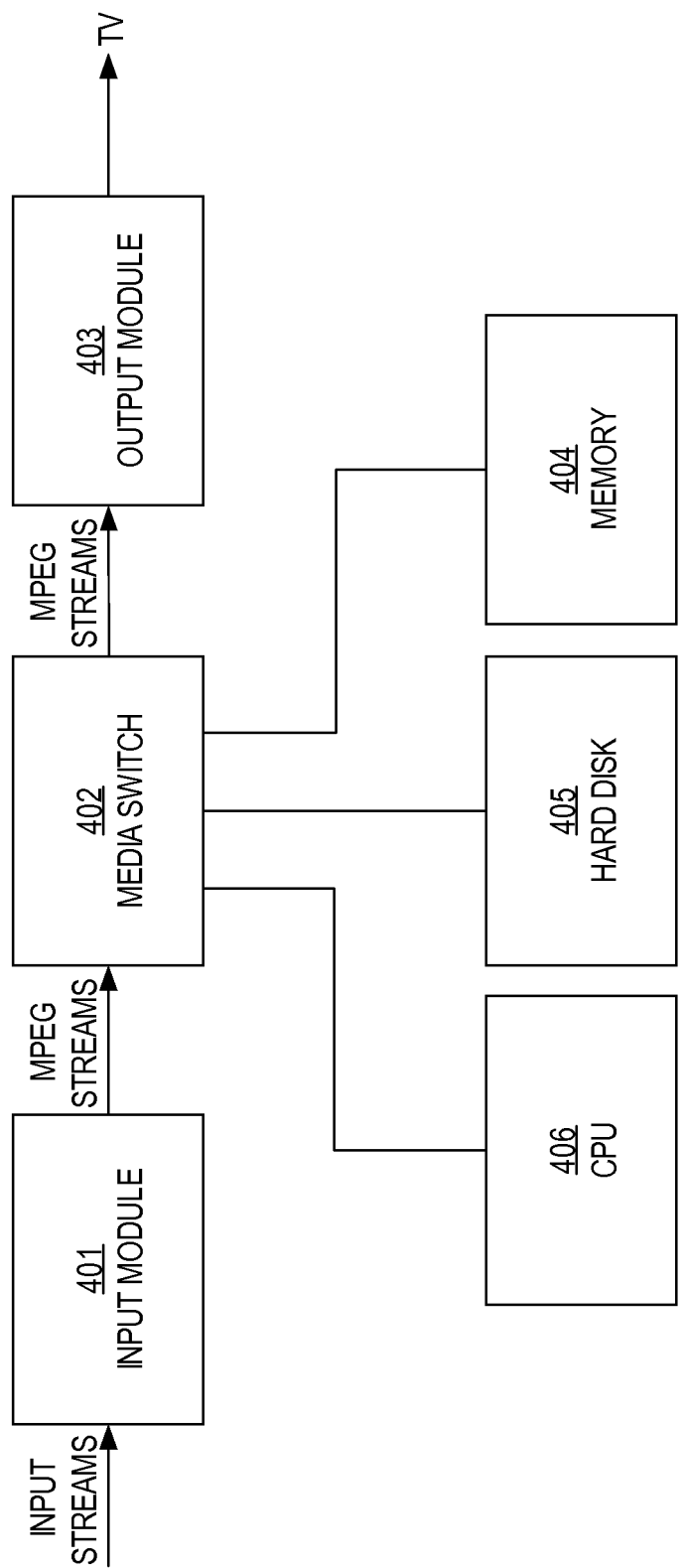
FIG. 4 illustrates an example multimedia device, in accordance with one or more embodiments.

FIG. 4 is a block diagram that shows an example of the internal structure and operation of a multimedia device, according to an embodiment of the invention. An example of the internal structure and operation of a media device such as a digital video recorder (DVR) is further described in U.S. Pat. No. 6,233,389, which is incorporated by reference as though originally disclosed herein.

The multimedia device shown in FIG. 4 comprises an input module 401, a media switch 402, and an output module 403. Input module 401 receives television (TV) input streams in any of a variety of forms and/or digital streams from a network (e.g., the Internet, an intranet, an extranet, etc.) source. For example, a TV input stream received by input module 401 may take the form of a National Television Standards Committee (NTSC) compliant signal or a PAL compliant broadcast signal. For another example, a TV input stream received by input module 401 may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. As another example, digital streams downloaded or streamed from a network may be in digital formats such as MPEG-2, MPEG-4, WMV, AVCHD, etc. According to one embodiment, input module 401 produces MPEG streams. In another embodiment, input module 401 produces streams that are encoded using a different codec.

In an embodiment, an MPEG-2 transport multiplex supports multiple programs in the same broadcast channel, with multiple video and audio feeds and private data. In an embodiment, input module 401 tunes the channel to a particular program, extracts a specified MPEG stream from the channel, and feeds the MPEG stream to the rest of the system. In an embodiment, input module 401 downloads a digital stream from a source across the Internet and feeds the digital stream to the rest of the system. Analog TV signals can be encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input module 401 and passed to the other modules as if, for example, the signals had been delivered via an MPEG-2 private data channel.

In an embodiment, a media switch 402 can mediate data transfers between a microprocessor CPU 406, a hard disk or storage device (e.g., an SSD, etc.) 405, and memory (e.g., RAM, DRAM, etc.) 404. Input streams may be converted to an MPEG stream (e.g., MPEG-2, MPEG-4, etc.), if the input stream is not in such a format, and sent to media switch 402. Media switch 402 can buffer the MPEG stream into memory 404. In an embodiment, media switch 402 can mediate between the memory 404 and hard disk or storage device 405 and cause the MPEG stream to be stored on the hard disk or storage device 405. In an embodiment, media switch 402 can perform two simultaneous operations when a user of the multimedia device is watching a real-time stream: media switch 402 can send the MPEG stream to output module 403 and simultaneously store the MPEG stream to hard disk or storage device 405.

In an embodiment, output module 403 receives MPEG streams as input from buffers received from media switch 402 and produces analog or digital signals according to any of: NTSC, PAL, HDMI, DVI, other TV standards, etc. In an embodiment, output module 403 may comprise any combination of: an MPEG decoder, an on-screen display (OSD) generator, an analog TV encoder, audio logic, etc. The OSD generator allows the program logic from CPU 406 to supply images which may be overlaid on top of the resulting analog or digital signal. In an embodiment, output module 403 can modulate information supplied by the program logic onto the private data channel or VBI of the output signal in a number of standard formats, including NABTS, CC, and EDS.

8.0 EXAMPLE EMBODIMENTS

FIG. 3A illustrates an example method according to an embodiment of the present invention. In some embodiments, one or more computing devices (e.g., mobile device 104 of FIG. 1) may perform this method. In an embodiment, mobile device 104 may discover, while at a first location, one or more local wireless networks that include a local wireless network (106 of FIG. 1 and FIG. 2). Mobile device 104 may select local wireless network 106 for connection on to the Internet 108, other devices, etc.

In block 310, mobile device 104 receives an invitational message from local wireless network 106 or a local or remote server via local wireless network 106. The invitational message may be one of one or more invitational messages that are received by the mobile device at a first location and that are localized to the first location.

In an embodiment, the mobile device receives user input for a selection of action relating to the invitational message.

In block 320, in response to receiving the invitational message, mobile device 104 sends a scheduling request to a content transfer scheduling server (e.g., 110 of FIG. 1) for specific media content, the scheduling request causing a transfer or recording of the specific media content to/on a multimedia device (102 of FIG. 1 and FIG. 2) to be scheduled. Multimedia device 102 may be associated with a user of mobile device 104.

In an embodiment, multimedia device 102 is presently located remotely from a location of mobile device 104. In an embodiment, content transfer scheduling server 110 is configured to provide instructions to a plurality of multimedia devices including multimedia device 102 for scheduling a content transfer to or recording by the multimedia devices, respectively.

In an embodiment, mobile device 104 disconnects with local wireless network 106 as mobile device 104 moves away from the first location. Mobile device 104 may discover, while at a second new location, one or more second local wireless networks. Mobile device 104 may select a second local wireless network, among the one or more second local wireless networks, for connection on to Internet 108, other devices, etc. Mobile device 104 may receive a second new invitational message from the second local wireless network. In response to receiving the second invitational message, mobile device 104 may send a second scheduling request to content transfer scheduling server 110 for second specific media content, the second scheduling request causing a transfer of the second specific media content to multimedia device 102 to be scheduled.

In an embodiment, at least one of the mobile device, the content transfer scheduling server, or the multimedia device determines the specific media content based at least in part on the invitational message.

In an embodiment, the invitational message comprises a quick response (QR) code. Mobile device 104 or another device as described herein may optically recognize the quick response code from a QR code image in the invitational message.

In an embodiment, the specific content is identified as accessible at a URL to the multimedia device. In an embodiment, a version of the specific content identified to the multimedia device is a different version of the specific content identified in the invitational message.

FIG. 3B illustrates an example method according to an embodiment of the present invention. In some embodiments, one or more computing devices (e.g., mobile device 104 of FIG. 1) may perform this method. In some embodiments, as illustrated in FIG. 2, scheduling content transfer by a multimedia device (e.g., 102 of FIG. 2) may be performed between mobile device 104 and multimedia device 102 directly without any intervention of a content transfer scheduling server (e.g., 110 of FIG. 1).

In block 350, mobile device 104 receives an invitational message from a local wireless network (e.g., 106 of FIG. 2).

In block 360, in response to receiving the invitational message, mobile device 104 sends a scheduling instruction to a multimedia device (e.g., 102 of FIG. 2) to cause a transfer of the specific media content to a multimedia device to be scheduled.

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

9.0 HARDWARE OVERVIEW

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for a window configuration unit. According to one embodiment, the window configuration unit is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for a remote display device as described herein.

The received code may be executed by processor 504 as it is received, and/or stored in storage device 510, or other non-volatile storage for later execution. In this manner, computer system 500 may obtain application code in the form of a carrier wave.

10.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or characteristic that is not expressly recited in a claim should limit the scope of such claim in any way. The specification and drawings are, accordingly, to be regarded in an illustrative rather than a restrictive sense.

What is claimed is:

1. A method comprising:
   detecting entry of a mobile device into a spatial range of a local wireless network;
   downloading an application to the mobile device in response to a user accessing the local wireless network;
   receiving, from the local wireless network, using the application, an invitational message for recording a specific media content, the local wireless network being operated by an entity that provides the invitational message, the invitational message being sent by the local wireless network in response to the local wireless network detecting the mobile device, the invitational message having content based on a present location of the local wireless network; and
   in response to receiving the invitational message, the mobile device using the application to send a scheduling request to a server for the specific media content, the scheduling request causing a recording by a multimedia device of the specific media content to be scheduled.

2. The method of claim 1, further comprising:
   while at a first location, discovering one or more local wireless networks that include the local wireless network; and
   selecting the local wireless network for connection with the mobile device.

3. The method of claim 1, further comprising:
   disconnecting from the local wireless network as the mobile device moves away from a first location;
   while at a second new location, discovering one or more second local wireless networks;
   selecting a second local wireless network, among the one or more second local wireless networks, for connection with the mobile device at the second location;
   receiving a second new invitational message from the second local wireless network; and
   in response to receiving the second invitational message, the mobile device sending a second scheduling request to the server for a second specific media content, the second scheduling request causing a recording of the second specific media content at the multimedia device to be scheduled.

4. The method of claim 1, wherein the invitational message is received by the mobile device at a first location and the invitational message is localized to the first location.

5. The method of claim 1, wherein the mobile device is determined to be at a first location based on a proximity determination.

6. The method of claim 1, further comprising at least one of the mobile device, the server, or the multimedia device determining the specific media content based at least in part on the invitational message.

7. The method of claim 1, further comprising: the mobile device receiving user input for a selection of an action relating to the invitational message.

8. The method of claim 1, wherein the invitational message comprises a quick response (QR) code.

9. The method of claim 8, further comprising: optically recognizing the quick response code from a QR code image in the invitational message.

10. The method of claim 1, wherein the specific media content is identified to the multimedia device as accessible at a URL.

11. The method of claim 1, wherein the server is configured to provide instructions to a plurality of multimedia devices including the multimedia device for scheduling content recordings at the multimedia devices.

12. A non-transitory computer readable medium storing a sequence of instructions, which when executed by one or more processors, cause performing:
   detecting entry of a mobile device into a spatial range of a local wireless network;
   downloading an application to the mobile device in response to a user accessing the local wireless network;
   receiving, from the local wireless network, using the application, an invitational message for recording a specific media content, the local wireless network being operated by an entity that provides the invitational message, the invitational message being sent by the local wireless network in response to the local wireless network detecting the mobile device, the invitational message having content based on a present location of the local wireless network; and in response to receiving the invitational message, the mobile device using the application to send a scheduling request to a server for the specific media content, the scheduling request causing a recording by a multimedia device of the specific media content to be scheduled.

13. The non-transitory computer readable medium of claim 12, wherein the sequence of instructions further comprise instructions, which when executed by one or more processors, cause performing:
while at a first location, discovering one or more local wireless networks that include the local wireless network; and
selecting the local wireless network for connection with the mobile device.

14. The non-transitory computer readable medium of claim 12, wherein the sequence of instructions further comprise instructions, which when executed by one or more processors, cause performing:
disconnecting from the local wireless network as the mobile device moves away from a first location;
while at a second new location, discovering one or more second local wireless networks;
selecting a second local wireless network, among the one or more second local wireless networks, for connection with the mobile device at the second location;
receiving a second new invitational message from the second local wireless network; and
in response to receiving the second invitational message, the mobile device sending a second scheduling request to the server for a second specific media content, the second scheduling request causing a recording of the second specific media content at the multimedia device to be scheduled.

15. The non-transitory computer readable medium of claim 12, wherein the invitational message is received by the mobile device at a first location and the invitational message is localized to the first location.

16. The non-transitory computer readable medium of claim 12, wherein the mobile device is determined to be at a first location based on a proximity determination.

17. The non-transitory computer readable medium of claim 12, further comprising at least one of the mobile device, the server, or the multimedia device determining the specific media content based at least in part on the invitational message.

18. The non-transitory computer readable medium of claim 12, wherein the sequence of instructions further comprise instructions, which when executed by one or more processors, cause performing: the mobile device receiving user input for a selection of an action relating to the invitational message.

19. The non-transitory computer readable medium of claim 12, wherein the invitational message comprises a quick response (QR) code.

20. The non-transitory computer readable medium of claim 19, wherein the sequence of instructions further comprise instructions, which when executed by one or more processors, cause performing: optically recognizing the quick response code from a QR code image in the invitational message.

21. The non-transitory computer readable medium of claim 12, wherein the specific media content is identified to the multimedia device as accessible at a URL.

22. The non-transitory computer readable medium of claim 12, wherein the server is configured to provide instructions to a plurality of multimedia devices including the multimedia device for scheduling content recordings at the multimedia devices.

* * * * *